(12) United States Patent  (10) Patent No.: US 8,658,032 B2
Girondi  (45) Date of Patent: Feb. 25, 2014

(54) FILTER CARTRIDGE

(75) Inventor: Giorgio Girondi, Mantova (IT)

(73) Assignee: UFI Filters S.p.A., Porto Mantovano (Mantova) (IT)

( * ) Notice: Subject to any disclaimer, the term of this patent is extended or adjusted under 35 U.S.C. 154(b) by 0 days.

(21) Appl. No.: 13/981,527

(22) PCT Filed: Jan. 26, 2012

(86) PCT No.: PCT/IB2012/000122
§ 371 (c)(1),
(2), (4) Date: Jul. 24, 2013

(87) PCT Pub. No.: WO2012/104698
PCT Pub. Date: Aug. 9, 2012

(65) Prior Publication Data
US 2013/0306531 A1  Nov. 21, 2013

(30) Foreign Application Priority Data

Feb. 4, 2011 (IT) .............. RE2011A0005
Oct. 27, 2011 (IT) .............. RE2011A0090

(51) Int. Cl.
*B01D 27/10* (2006.01)
(52) U.S. Cl.
USPC .................... 210/130; 210/132; 210/149
(58) Field of Classification Search
USPC .................... 210/130, 132, 149
See application file for complete search history.

(56) References Cited

U.S. PATENT DOCUMENTS

| 2,076,935 | A | 4/1937 | Nash |
| 3,487,931 | A | 1/1970 | Paulson |
| 8,231,781 | B2 * | 7/2012 | Lepine et al. ............... 210/130 |

FOREIGN PATENT DOCUMENTS

| FR | 1136817 A | 5/1957 |
| GB | 1280357 A | 7/1972 |
| WO | 2010129450 A2 | 11/2010 |

* cited by examiner

*Primary Examiner* — Terry Cecil
(74) *Attorney, Agent, or Firm* — Browdy and Neimark, PLLC

(57) ABSTRACT

A filter cartridge (60, 160) comprising a filter wall (63, 163) having a tubular shape and at least a support plate (61, 161) fixed to an end of the filter wall (63, 163), characterized in that a by-pass conduit (66, 166) is fashioned in the support plate (61, 161), which by-pass conduit (66, 166) is designed to place an internal volume (64, 164) delimited by the filter wall (63, 163) in communication with outside, which by-pass conduit (66, 166) is intercepted by a valve (70, 170) which is associated to the support plate (61, 161) in an out-of-center position with respect to a longitudinal axis (A, A2) of the filter wall (63, 163), the valve (70, 170) comprising an internally-hollow valve body (71, 171), which is provided with a hole (72, 172) suitable for setting the bypass conduit (66, 166) in communication with the internal cavity of the valve body (71, 171), an obturator (73, 174) housed in the internal cavity of the valve body (71, 171), and an elastically-acting element (75, 180) suitable for pressing the obturator (73, 174) against a valve seating (74, 179) such as to close the hole (72, 172), the valve (70, 170) being housed internally of a seating (67, 167) afforded in the support plate (61, 161).

15 Claims, 5 Drawing Sheets

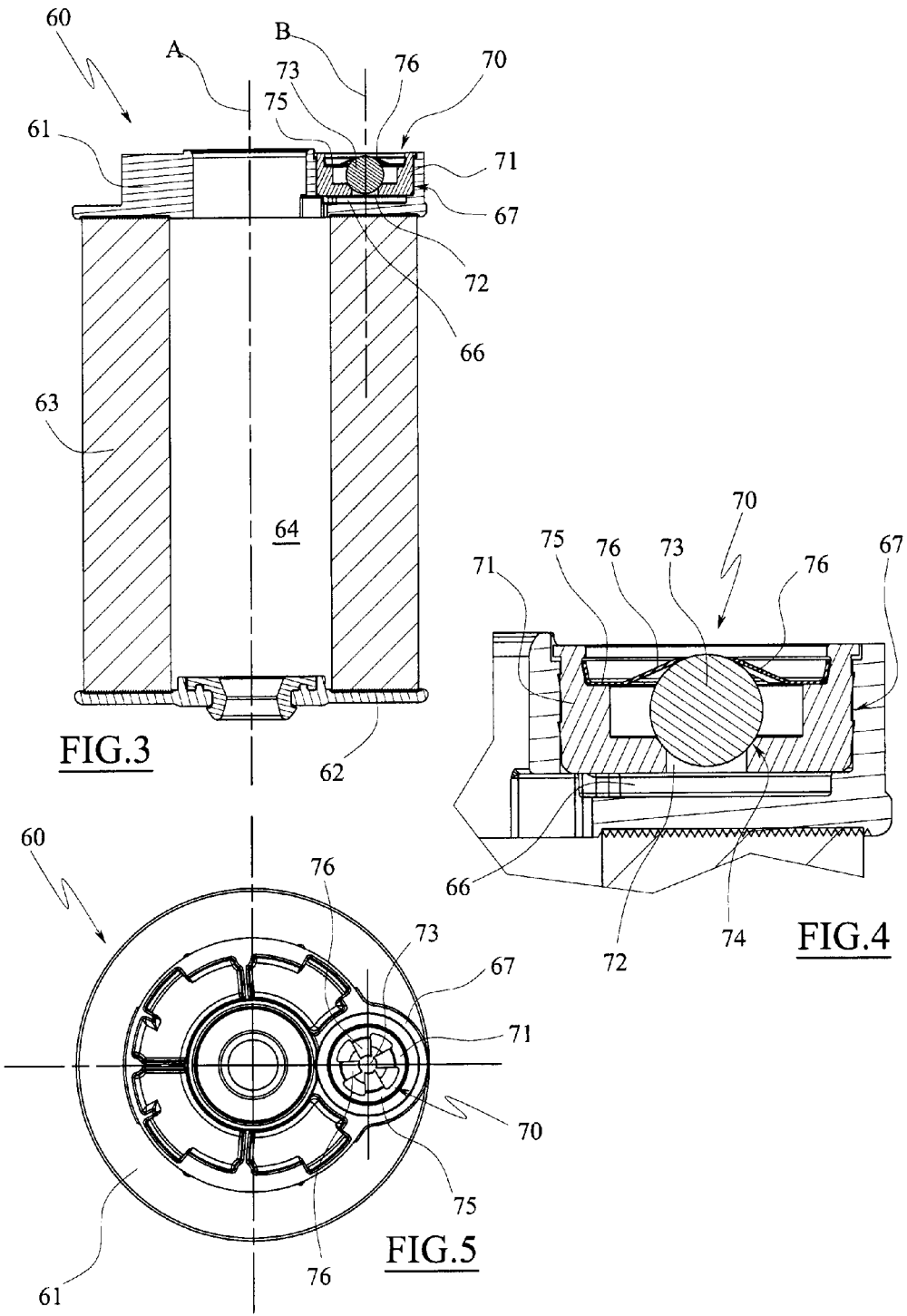

FILTER CARTRIDGE

TECHNICAL FIELD

The present invention relates to a filter cartridge and, in particular, to a filter cartridge for filtering fuel or lubricating oil for motoring applications, for example motor cars, lorries, commercial vehicles and work machines, or hydraulic applications.

BACKGROUND ART

As is known, the filtration of fuel or lubricating oil is generally obtained with a filter comprising an external casing provided with an inlet for fluid to be filtered and a outlet for the filtered fluid, and a filter cartridge destined to sub-divide the internal volume of the casing into two distinct chambers, of which a first chamber communicates with the inlet and a second chamber communicates with the outlet.

In this way, the fluid which flows from the inlet towards the outlet of the filter is forced to cross the filter wall which retains the impurities that may be present therein.

A typical filter cartridge comprises a tubular filter wall, for example a pleated filter wall or a depth wall, and two support plates which are fixed to opposite ends of the filter wall.

At least one of the support plates is commonly provided with a central opening, aligned with the longitudinal axis of the filter wall, across which the internal volume of the filter wall is set in communication with the inlet of the fluid to be filtered, in a case in which the filter wall is configured such as to be crossed from inside towards the outside, or with the outlet of the filtered fluid, in a case in which the filter wall is configured such as to be crossed from outside towards the inside.

During use, it can happen that the fluid to be filtered encounters excessive hydraulic resistance to passage across the filter wall, which excessively reduces the inflow of the fluid to the devices located downstream of the filter.

This can happen for example when the quantity of impurities accumulated have reached the point of completely clogging the filter wall, or when, due to particular operating conditions, the fluid to be filtered reaches very high levels of viscosity, as happens in a case of diesel fuel filtration in diesel engines, when the operating temperatures are very low.

To obviate this problem, filters have been fitted with an automatic bypass valve which following an increase in pressure in the chamber of the fluid to be filtered, which pressure goes beyond a predetermined value, is destined to open a direct passage between the chamber of the fluid to be filtered and the chamber of the filtered fluid, thus by-passing the filter wall.

The prior art provides various types of bypass valves for filters, some of which are associated to the external casing of the filter, while others are directly associated to the filter cartridge.

The by-pass valves associated to the filter cartridge are normally positioned or fashioned in the centre of one of the support plates, substantially aligned with the longitudinal axis of the relative filter wall.

Although this arrangement facilitates the realisation of the by-pass valve, it considerably limits the design of the filter cartridge, as the central zone of the support plates is that which generally also bears the engaging means with the filter casing as well as being the zone which exhibits the openings destined to place the internal volume of the filter wall in communication with the inlet or the outlet of the filter.

Patent application no. WO 2010/129450 describes a filter cartridge having a support plate in which a bypass valve is incorporated, which is arranged in an eccentric position with respect to the longitudinal axis of the filter wall. This arrangement of the bypass valve has the advantage of not interfering with the engaging means of the cartridge. However, the solution proposed in this patent application has the bypass valve completely integrated in the support plate, i.e. the support plate is conformed such as to make available a direct passage between the chamber of the fluid to be filtered and the chamber of the filtered fluid, as well as a cylindrical seating suitable for directly accommodating a mobile obturator element and a spring suitable for pushing the obturator element towards a closed position of the passage.

Though effective from the functional point of view, this constructional form introduces some important drawbacks. A first drawback is that in a case of malfunctioning of the bypass valve, it is necessary to demount and replace the whole support plate, by means of an operation which is often slow, laborious and therefore rather expensive. A further drawback is that the bypass valve has also to be assembled together with the filter cartridge, which requires adopting mounting procedures which are dedicated for each type of filter cartridge produced, and thus reducing the possibility of obtaining advantageous economies of scale.

DISCLOSURE OF INVENTION

An aim of the present invention is therefore to obviate the above-mentioned drawbacks in the prior art, with a solution which is simple, rational and relatively inexpensive.

The aim is attained thanks to the characteristics of the invention as reported in the independent claim. The dependent claims delineate preferred and/or particularly advantageous aspects of the invention.

In particular, the invention provides a filter cartridge comprising a filter wall having a tubular shape and at least a support plate fixed to an end of the filter wall. The support plate affords a by-pass channel destined to set the internal volume, delimited by the filter wall, in communication with outside, which by-pass channel is intercepted by a valve associated to the support plate in an out-of-centre position with respect to a longitudinal axis of the filter wall, preferably in line with a lateral wall thereof.

The valve comprises an internally hollow valve body, which is provided with a hole for placing the bypass conduit in communication with the internal cavity of the valve body, an obturator housed in the internal cavity of the valve body, and an elastically-acting element suitable for pressing the obturator against a valve seating such as to close the hole. Thus configured, the valve is accommodated as a single piece internally of a special seating afforded in the support plate.

Thanks to this solution, the central zone of the support plate is free and available in order to be able to house the engaging means of the filter cartridge with the filter casing and/or in order to increase the dimensions of the openings destined to place the internal volume of the filter wall in communication with the inlet or outlet of the fluid to be filtered, thus advantageously increasing the constructional alternatives of the filter cartridge.

Further, the by-pass system is completely deconstrained from the filter casing and can be advantageously replaced together with the filter cartridge, thus increasing the working life and efficiency of the entire filter.

At the same time, the bypass valve is an autonomous component with respect to the support plate of the filter cartridge.

Therefore, during the production stage, the bypass valve can further be produced in large quantities in order subsequently to be mounted on a plurality of types of filter cartridges, thus obtaining a significant economy of scale.

In a preferred aspect of the invention, the valve is received internally of the seating afforded in the support plate and unremovably housed there, for example by gluing or heat-welding.

In this way, the valve and the support plate form a single component which can be advantageously dimensioned, mounted and demounted as a single part integrating also the by-pass system.

In a further preferred aspect of the invention, the valve is removably housed in the seating.

Thanks to this detail, should it be faulty, the valve can be advantageously replaced independently of the other components of the filter cartridge.

In a further preferred aspect of the invention, the valve is configured such as to be destined to open the by-pass conduit following an increase in pressure in the internal volume delimited by the filter wall.

This solution makes the filter cartridge advantageously suitable to be used in applications in which the fluid to be filtered crosses the filter wall from inside towards the outside.

Alternatively, the bypass valve could be configured in such a way as to be destined to open the bypass conduit following a pressure drop in the internal volume delimited by the filter wall.

In this alternative configuration, the filter cartridge would be suitable for use in applications in which the fluid to be filtered is to cross the filter wall from outside towards the inside.

In a preferred embodiment of the invention, the valve comprises a spherical obturator and at least a slim elastic plate destined to maintain the obturator pressed against a valve seating, such as to close the by-pass conduit, and the obturator, the elastic plate and the valve seating are preferably associated to a valve body preferably having a substantially cylindrical shape.

This solution has the advantage of providing a particularly simple valve to realise, which is compact and which occupies a small space while being very efficient.

In a further aspect of the invention, the filter cartridge can further comprise a heat-sensitive element configured such as to occlude the bypass conduit when the temperature of the heat-sensitive element exceeds a predetermined threshold value. This solution can be advantageous as the bypass valve delineated herein above is commanded only by the pressure fall of the fluid through the filter wall, and therefore opens each time the pressure fall exceeds a threshold value, independently of the cause which has generated it.

In more detail, the bypass valve delineated herein above could open not only due to an excessive viscosity of the diesel due to the low temperatures, but also for example in the case of a partial clogging of the filter wall (in itself still acceptable), with the result that the engine would be wrongly supplied with non-filtered diesel, even during normal functioning conditions.

Thanks to the introduction of the heat-sensitive element the fluid passage through the bypass conduit is advantageously regulated by a double control system: a first control system defined by the valve and connected to the pressure difference through the filter wall, and a second control system defined by the heat-sensitive element and linked to the fluid temperature.

Indeed, should the pressure difference either side of the filter wall be sufficient to open the valve, for example because of the partial clogging of the filter wall, but at the same time the fluid temperature were high enough to heat the heat-sensitive element above the relative threshold temperature, the heat-sensitive element would close the relative threshold temperature, the heat-sensitive element would close the bypass conduit and would prevent the non-filtered fluid from reaching locations downstream of the filter, advantageously preventing any eventual malfunctioning thereof.

The closing of the bypass conduit due to the heat-sensitive element can be complete, in such a way as to totally prevent passage of the fluid, or partial, as long as it causes losses of pressure that are so high that they do not allow the devices downstream of the filter to function.

In a preferred aspect of the invention, the heat-sensitive element is associated to the bypass valve.

This aspect of the invention has the advantage of making available a device that is integrated and very compact, which can be mounted and replaced as a single piece with respect to the other components of the filter cartridge.

In an embodiment of the invention, the heat-sensitive element is an elastically-acting element suitable for pressing the obturator of the bypass valve against the relative valve seating, which has an elastic constant that increases following an increase in temperature.

By way of example, the elastically-acting element might be made of a memory material which, when the temperature increases, reaches a martensitic stage with a consequent increase in the elastic constant.

In particular, the heat-sensitive element might be the same elastic element already provided for the bypass valve, which would therefore comprise a single elastically-acting element suitable for performing a double function, or it might be a further elastically-acting element which is added and aids the one already provided for pressing the obturator against the valve seating, which element might therefore have an elastic constant that is independent of the temperature.

In both cases, when the temperature of the heat-sensitive element increases above a predetermined threshold value, the rigidity of the elastic element defined thereby can be so high as to prevent the obturator from distancing from the valve seating, even should the pressure difference either side of the filter wall be greater than the threshold value which would normally cause the opening of the valve.

Alternatively, the heat-sensitive element might more simply be an element suitable for moving from an initial configuration to a final configuration following an increase in temperature, for example due to a deformation.

By way of example, the element might be a bi-metallic element comprising at least two layers made of materials having different heat dilation properties, such that when the temperature increases a layer is deformed more than the other, thus deforming the heat-sensitive element.

The heat-sensitive element might thus be predisposed in such a way that, in the initial configuration, it is separated from the obturator, leaving it free to distance from the valve seating in contrast with the elastically-acting element and that in the final configuration, it is in contact with the obturator, maintaining it blocked against the valve seating.

Alternatively, the heat-sensitive element might be more simply predisposed in such a way that, in the initial configuration, it leaves the bypass conduit open, and in the final configuration is obstructs the bypass conduit.

By way of example, the heat-sensitive element might be a wax valve comprising a sliding body by means of the dilation of the wax when the temperature varies, possibly in contrast with a recall spring suitable for returning the sliding body into the initial position.

The invention further provides a filter comprising an external casing provided with an inlet for a fluid to be filtered and an outlet for the filtered fluid, and a filter cartridge of the type described herein above, which is destined to divide the internal volume of the casing into a first chamber communicating with the inlet and a second chamber communicating with the outlet.

In a preferred aspect of the invention, the filter cartridge is arranged such that the first chamber is at least partially defined by the internal volume delimited by the filter wall, and such that the by-pass conduit is destined to place the internal volume in communication with the second chamber.

In this way, the fluid to be filtered will be advantageously forced to cross the filter wall of the cartridge from inside towards the outside.

In a further preferred aspect of the invention, the second chamber communicates with the outlet of the filtered fluid by means of a second filter wall having a greater porosity with respect to the filter wall of the filter cartridge.

This solution has the advantage of guaranteeing that the fluid is at least roughly filtered even in a case in which it by-passes the filter wall of the cartridge following opening of the valve associated to the by-pass conduit.

The second filter wall is preferably flat and arranged perpendicularly to the longitudinal axis of the filter wall of the filter cartridge.

In this way the filter is advantageously rather compact and has a contained overall size.

The second filter wall is preferably borne by a plate having a perimeter edge to which an annular seal is further coupled, which seal is destined to be interposed between a beaker-shaped body and a closing cover of the external casing of the filter.

Thanks to this solution, the second filter wall, the plate and the annular seal form a single component which can be advantageously replaced in a single piece, while at the same time restoring both the efficiency of the second filter wall and the seal of the filter casing.

In a preferred aspect of the invention, the filter further comprises a special monolithic component, which incorporates a connecting channel between the filter inlet and the internal volume of the filter wall, a heater associated to the connecting channel for heating the fluid flowing internally thereof, a stem destined to axially cross the internal volume of the filter wall, and a water level sensor located at an end of the stem which projects internally of the second filter chamber.

This solution is particularly advantageous, for example, in a case in which the filter is destined to filter the fuel for diesel engines, as the above-mentioned monolithic component is effectively able to perform alone a triple function, i.e. the function of guiding the diesel internally of the filter cartridge, the function of heating the diesel such as to dissolve the paraffins which can form at low working temperatures, and the function of detecting the level of the water which separates from the diesel during filtration and which accumulates on the bottom of the filter casing.

BRIEF DESCRIPTION OF DRAWINGS

Further characteristics and advantages of the invention will more fully emerge from a reading of the following description, provided by way of non-limiting example, with the aid of the figures of the accompanying tables of drawings.

FIG. 3 is section of FIG. 2;

FIG. 4 is an enlarged detail of FIG. 3;

FIG. 5 is a view from above of FIG. 3.

BEST MODE FOR CARRYING OUT THE INVENTION

Figure 1:
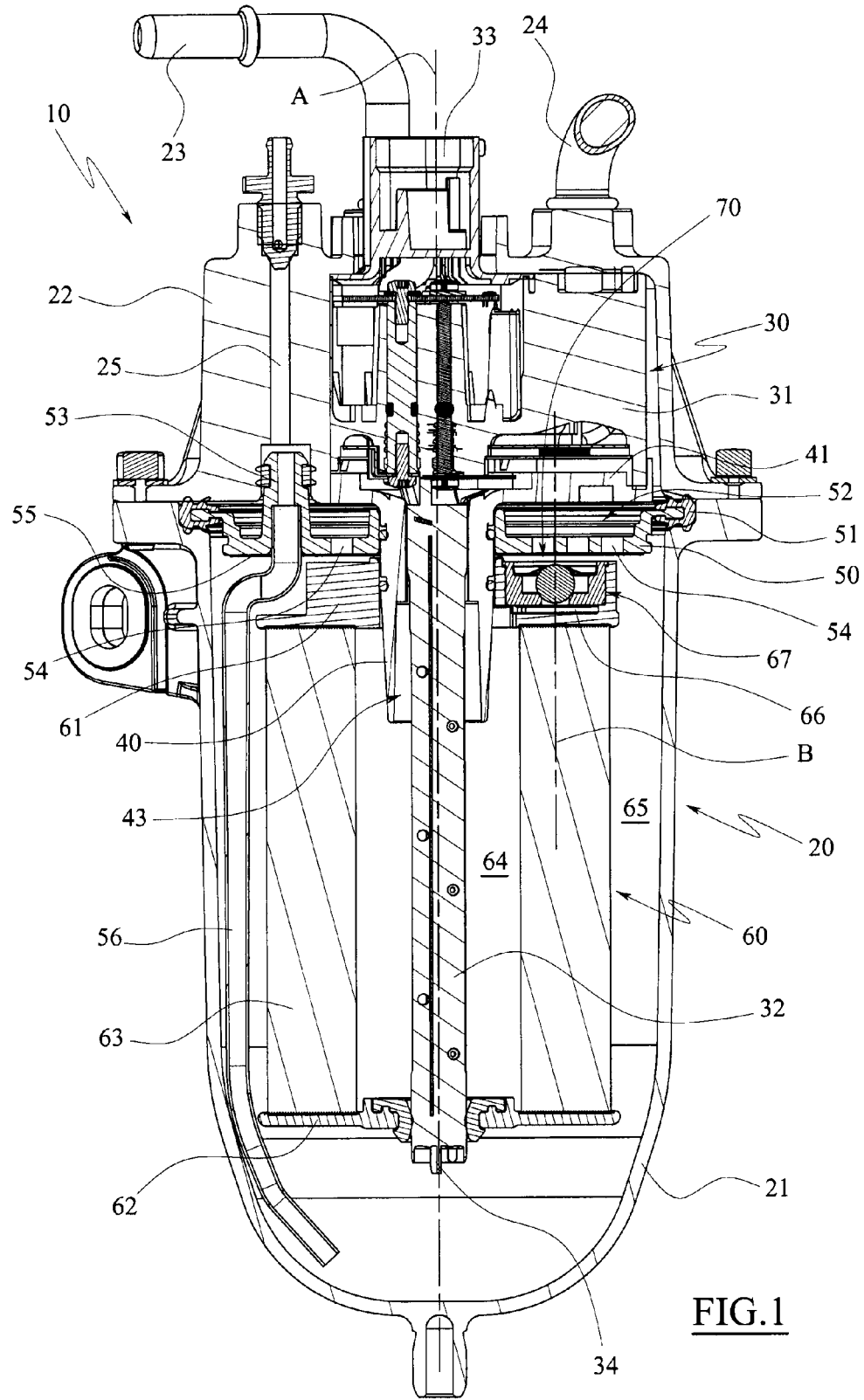
FIG. 1 is a longitudinal section of a filter in an embodiment of the present invention.

The filter 10 illustrated in FIG. 1 is a diesel filter destined to be applied in diesel engines, in particular diesel for motor cars, lorries, commercial vehicles or self-propelling work vehicles.

The filter 10 comprises an external casing, denoted in its entirety by 20, which is defined by a lower body 21 shaped as a beaker and an upper cover 22 destined to close the beaker body 21.

The cover 22 comprises an inlet conduit 23 for the diesel to be filtered, an outlet conduit 24 for filtered diesel and a discharge conduit 25 for the water which can be accumulated on the bottom of the beaker body 21.

A monolithic component 30 is housed internally of the casing 20, which comprises a broadened upper portion 31 which is housed in a corresponding seating afforded in the cover 22, and a lower stem portion 32 which is welded to the broadened portion 31 and develops axially in a downwards direction internally and centrally of the beaker body 21.

A sleeve 40 is inserted coaxially on the stem portion 32, the upper end of which exhibits a substantially flat flange 41 which is sealedly welded with the broadened portion 31 of the monolithic component 30.

The sleeve 40 is dimensioned such as to define, with the stem portion 32, a hollow space 43, which is slightly tapered in an upwards direction and is in communication with the inlet conduit 23 of the diesel to be filtered through a connecting channel (not visible) which is afforded in the broadened portion 31 of the monolithic component 30.

The broadened portion 31 incorporates an electric heater (not visible) destined to heat the diesel which flows into the connecting channel, which is electrically supplied by means of an electric socket 33 which projects from the cover 22.

A disc-shaped plate 50 is coaxially inserted on the sleeve 40, with an interposing of a seal ring, which disc-shaped plate 50 comprises a central hole for coupling with the sleeve 40 and a perimeter edge that is slightly raised and to which an annular seal 51 is tightly coupled.

The annular seal 51 is housed and compressed internally of a seating which is defined between the cover 22 and the beaker body 21, such as to guarantee hermetic closure of the external casing 20 of the filter 10.

The plate 50 further comprises a hollow spur 53 which inserts, with an interposing of a seal ring, into a special broadening of the discharge conduit 25.

A narrow chamber 52 is defined between the plate 50 and the overlying flange 41, which chamber 52 communicates with the outlet conduit 24 of the filtered diesel via a connecting channel (not visible) afforded partly in the flange 41 and partly in the broadened portion 31 of the monolithic component 30.

A filter cartridge, denoted in its entirety by 60, is further housed internally of the casing 20, which filter cartridge 60 comprises an upper support plate 61 and a lower support plate 62, which are fixed to opposite ends of a tubular filter wall 63, in the present example a polymer depth wall defining and delimiting a substantially-cylindrical internal volume 64.

Both the upper support plate 61 and the lower support plate 62 exhibit a respective central hole, which holes are aligned to one another and centred on the longitudinal axis A of the filter wall 63.

The central hole of the upper support plate 61 is inserted on the sleeve 40, with an interposing of a seal ring, such that the stem portion 32 of the monolithic component 30 axially crosses the whole internal volume 64 of the filter cartridge 60 up to inserting, with an interposing of a further seal ring, into the central hole of the lower support plate 62.

The free end of the stem portion 32 projects beyond the lower support plate 62, where it bears a level sensor 34 destined to detect a level of the water which accumulates on the bottom of the beaker-shaped body 21.

The level sensor 34 is associated to electric connecting means which are incorporated in the monolithic component 30 and which reach the electric socket 33 by which the level sensor 34 is connected to an electronic control panel (not illustrated) of the vehicle.

Thanks to the above-described configuration, the filter cartridge 60 sub-divides the internal volume of the casing 20 into a first chamber, coinciding with the internal volume 64 of the filter wall 63, which communicates with the inlet conduit 23 of the diesel to be filtered, and a second chamber 65, defined externally of the filter wall 63, which communicates with the outlet conduit 24. In particular, the second chamber 65 communicates with the outlet conduit 24 through a plurality of through-holes 54 which are afforded in the body of the plate 50 and which open into the overlying chamber 52.

These through-holes 54 are all intercepted by a flat filter wall 55, which is fixed to the lower surface of the plate 50, where it lies in a perpendicular plane to the axis A of the filter wall 63.

Alternatively, the flat filter wall 55 might be fixed to the upper surface of the plate 50.

The flat filter wall 55 generally has a greater porosity than the filter wall 63.

In the illustrated example, the flat filter wall 55 is a polymer net having a porosity comprised between 100 and 200 μm, preferably 150 μm; while the filter wall 63 has a porosity of lower than 20 μm in a case in which it is pleated, or has at least a layer having a porosity of lower than 20 μm in a case in which it is a depth filter.

A shaped tube 56 is further located in the second chamber 65, which shaped tube 56 exhibits a first end coupled to the hollow spur 53 of the plate 50 and a second end located at the bottom of the beaker-shaped body 21.

As illustrated in FIGS. 1, 3 and 4, a conduit 66 is afforded in the upper support plate 61 of the filter cartridge 60, which conduit 66 is destined to set the internal volume 64 of the filter wall 63 directly in communication with the outside, i.e. with the second chamber 65 in this case.

This conduit 66 opens in the centre of a cylindrical seating 67 which is afforded on the external surface of the upper support plate 61, in an out-of-centre position with respect to the longitudinal axis A of the filter wall 63, substantially aligned with the lateral wall thereof.

In other words, the cylindrical seating 67 exhibits a longitudinal axis B which is parallel to and dealigned with respect to the longitudinal axis A of the filter wall 63, and which longitudinally crosses the thickness of the wall thereof.

The cylindrical seating 67 sealedly houses an automatic valve, denoted in its entirety by 70, which is destined to intercept the conduit 66 in such a way as to regulate the opening and closing thereof.

In detail the automatic valve 70 comprises a hollow valve body 71, conformed substantially as a cylindrical beaker, which is coaxially inserted internally of the cylindrical seating 67 by means of a removable joint coupling.

A central through-opening 72 is afforded on the bottom of the valve body 71, which is destined to place the conduit 66 in communication with the internal cavity of the valve body 71.

A sphere 73 is housed in the internal cavity of the valve body 71, which is destined to rest on a countersunk edge 74 of the hole 72, such as to close the conduit 66.

In particular, the sphere 73 is maintained pressed against the countersunk edge 74 by an elastic element 75, which is constrained to the mouth of the valve body 71.

Figure 2:
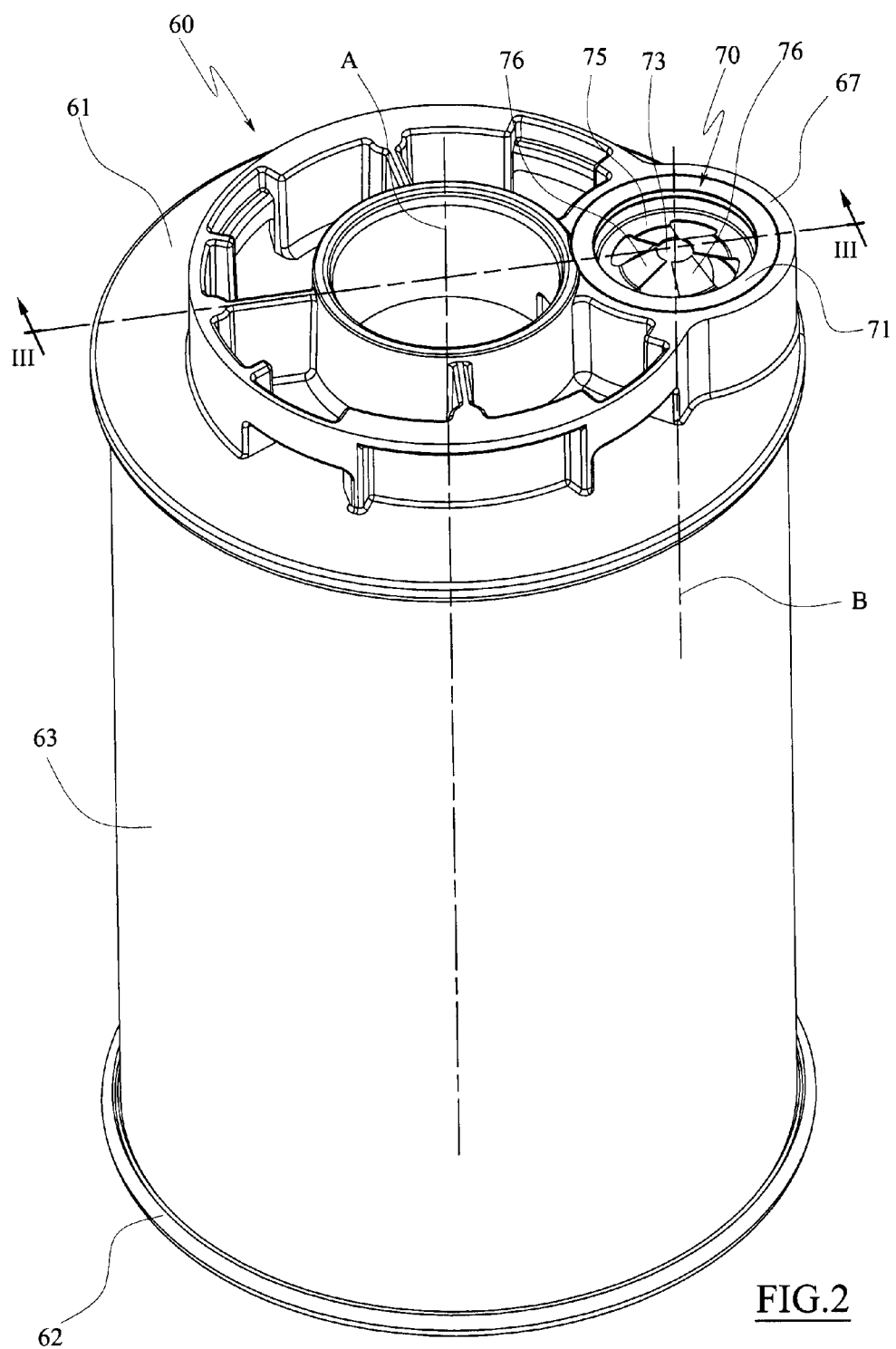
FIG. 2 is a perspective view of a filter cartridge inserted in the filter of FIG. 1.

As illustrated in FIG. 2, this elastic element 75 is defined by a slim metal ring arranged coaxially to the valve body 71, which elastic element 75 exhibits a series of radial plates 76 which project towards the centre of the ring, such that free ends of the plates 76 rest on the sphere 73 and press it towards the hole 72.

The radial plates 76 are angularly equidistanced from one another, such as to leave a same number of passage spaces which enable the mouth of the valve body 71 to be kept constantly open, and are elastically flexible such as to enable the sphere 73 to perform small displacements upwards and thus open the hole 72.

In the light of the above description, the functioning of the filter 10 is as follows.

The diesel to be filtered enters from the inlet conduit 23 and, through the connecting channel (not illustrated), afforded in the monolithic component 30 and the space 43, flows into the internal volume 64 of the filter wall 63.

During this passage, the diesel can be heated by the heater which is incorporated in the broadened portion 31 of the monolithic component 30.

The diesel is forced to flow radially from the internal volume 64 through the filter wall 63, from inside towards outside, and thence into the second chamber 65.

In this way the filter wall 63 retains the impurities which can be present in the diesel fuel.

The diesel flows from the second chamber 65 across the flat filter wall 55 which, as it has a greater porosity than the filter wall 63, has mainly the function of separating, by coalescence, the water which can still be contained in the diesel.

The water, thus separated, collects on the bottom of the beaker-shaped body 21 and, when the level of the water reaches the sensor 34, the sensor 34 sends a signal to the control panel of the vehicle, following which the accumulated water is made to exit from the filter 10 through the shaped tube 56 and the discharge conduit 25.

After having crossed the flat filter wall 55, the diesel finally reaches the outlet conduit 24.

Should the pressure of diesel in the internal volume 64 grow to exceed a determined threshold limit, for example following clogging of the filter wall 63 or an excessive viscosity of the diesel at low temperatures, this pressure causes a raising of the sphere 73 of the automatic valve 70 in opposition to the radial plates 76, and thus the opening of the conduit 66 which empties into the second chamber 65.

In this way, the non-filtered diesel flows directly into the second chamber 65 without crossing the filter wall 63, and thus guarantees that there is always a certain outflow of diesel from the outlet conduit 24.

In this case too, all the diesel is forced to cross the flat filter wall 55 which not only performs the above-mentioned function of separating the water, but also subjects the diesel to a rough filtering which at least removes the larger-dimension impurities.

Figure 6:
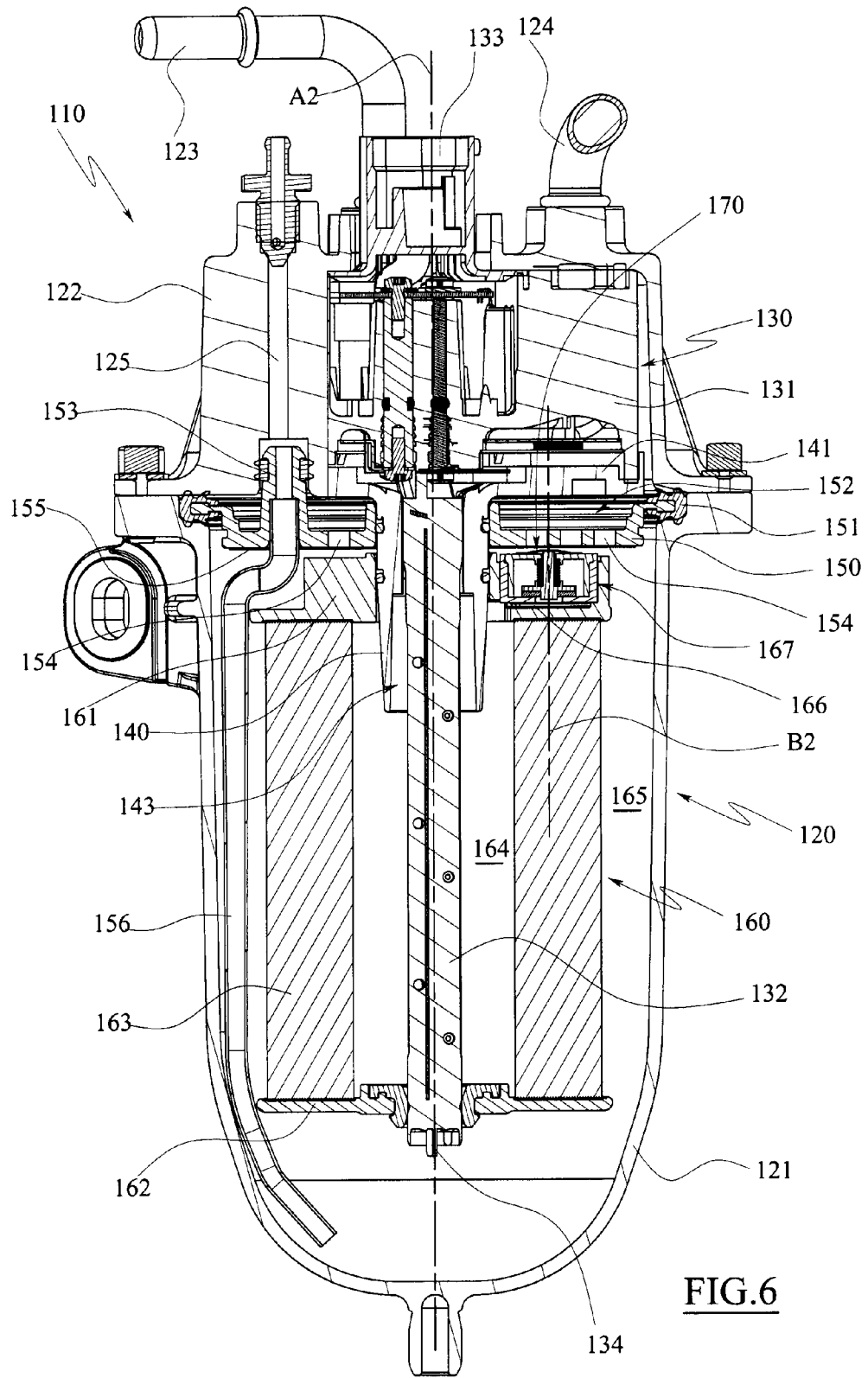
FIG. 6 is a longitudinal section of a filter according to a variant of the present invention.
Figure 7:
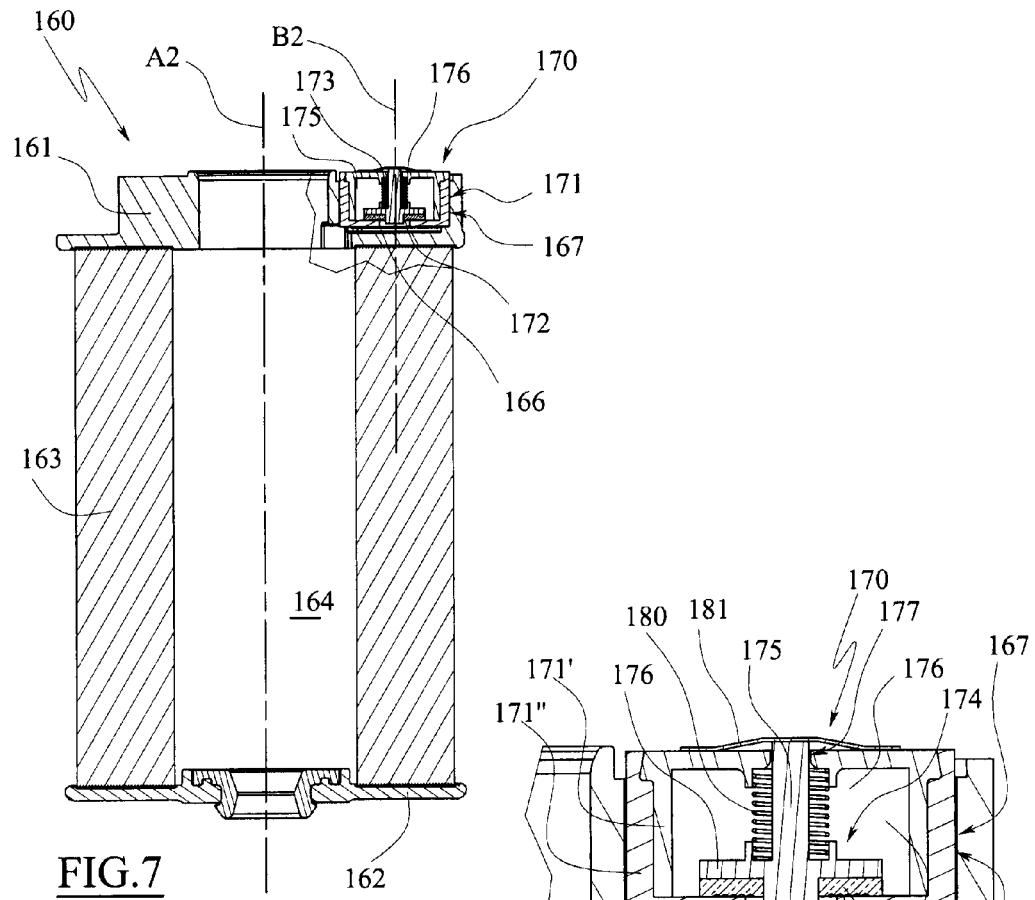
FIG. 7 is the longitudinal section of the filter cartridge inserted in the filter of FIG. 6.
Figure 8:
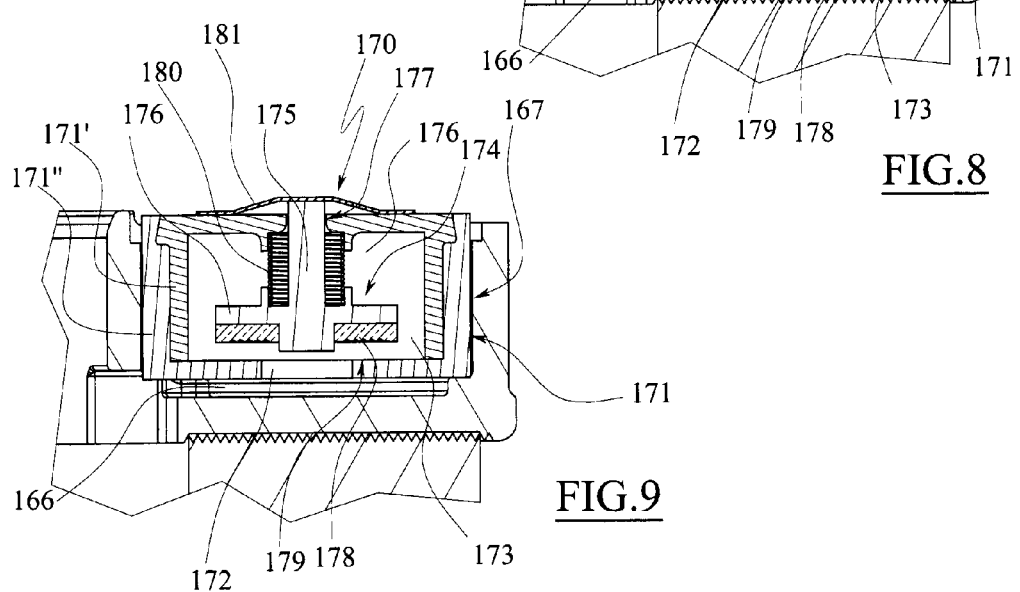
FIG. 8 is an enlarged detail of FIG. 7, which shows the bypass valve in a closed position.

The filter 110 shown in FIG. 6 is a diesel filter intended to be applied on diesel engines, in particular diesel engines for motor cars, trucks, commercial vehicles or self-propelled work machines.

The filter 110 comprises an outer casing, generally indicated with 120, which is defined by a beaker-shaped lower body 121 and by an upper cover 122 suitable for closing the beaker body 121.

The cover 122 comprises an inlet conduit 123 for the diesel to be filtered, an outlet conduit 124 for the filtered diesel and a discharge conduit 125 for water which can accumulate on the bottom of the beaker body 121.

A monolithic component 130 is housed internally of the casing 120, which monolithic component 130 comprises a widened upper portion 131 which is received in a corresponding seating afforded in the cover 122, and a lower stem portion 132 which is welded to said widened portion 131 and develops axially downwards inside and at the centre of the beaker body 121.

A sleeve 140 is coaxially fitted on the stem portion 132, an upper end of which exhibits a substantially flat flange 141 which is airtightly sealingly welded to the widened portion 131 of the monolithic component 130.

The sleeve 140 is dimensioned so as to define, together with the stem portion 132, an interspace 143, which is slightly tapered in an upwards direction and is in communication with the inlet conduit 123 of the diesel to be filtered through a connection channel (not visible) which is afforded in the widened portion 131 of the monolithic component 130.

The widened portion 131 incorporates an electric heater (not visible) suitable for heating the diesel flowing in the aforementioned connection channel, which is electrically supplied via an electric socket 133 which projects from the cover 122.

A disc-shaped plate 150 is coaxially inserted on the sleeve 140 by interposing a sealing ring, which plate 150 comprises a central hole for coupling with the sleeve 140 and a slightly raised perimeter edge to which an annular gasket 151 is tightly coupled.

Said annular gasket 151 is received and compressed internally of a seating which is defined between the cover 122 and the beaker body 121, so as to guarantee airtight closure of the outer casing 120 of the filter 110.

The plate 150 further comprises a hollow shank 153 which inserts, with interposition of a sealing ring, in a special widening of the exhaust conduit 125.

A narrow chamber 152 is defined between the plate 150 and the overlying flange 141, which chamber 152 communicates with the outlet conduit 124 of the filtered diesel through a connection channel (not visible) partly afforded in the flange 141 and partly in the widened portion 131 of the monolithic component 130.

A filter cartridge is also housed internally of the casing 120, generally denoted by 160, which cartridge comprises an upper support plate 161 and a lower support plate 162, fixed at opposite ends of a tubular filter wall 163, a polymer depth membrane in the present example, which defines and delimits a substantially cylindrical internal volume 164.

Both the upper support plate 161 and the lower support plate 162 have a respective central hole, the holes being aligned to one another and centred on the longitudinal axis A of the filter wall 163.

The central hole of the upper support plate 161 is inserted on the sleeve 140, with interposition of a seal ring, such that the stem portion 132 of the monolithic component 130 axially traverses the entire internal volume 164 of the filter cartridge 160 up to being inserted, with the interposition of another seal ring, in the central hole of the lower support plate 162.

The free end of the stem portion 132 projects beyond the lower support plate 162, where it bears a level sensor 134 suitable for detecting the level of the water which accumulates on the bottom of the beaker body 121.

The level sensor 134 is associated to means for electrical connection which are incorporated in the monolithic component 130 and which reach the electric socket 133, through which the level sensor 134 is connected to an electronic control unit (not shown) of the vehicle.

Thanks to the configuration described above, the filter cartridge 160 divides the internal volume of the casing 120 into a first chamber, coinciding with the internal volume 164 of the filter wall 163, which communicates with the inlet conduit 123 of the diesel to be filtered, and a second chamber 65, defined outside the filter wall 163, which communicates with the outlet conduit 124.

In particular, the second chamber 165 communicates with the outlet conduit 124 through a plurality of through openings 154 which are afforded in the body of the plate 150 and which open into the overlying chamber 152.

These through openings 154 are intercepted by a flat filter wall 155, which is fixed to the lower surface of the plate 150, where it lies in a perpendicular plane to the axis A of the filter wall 163.

Alternatively, the flat filter wall 155 could be fixed to the upper surface of the plate 150.

The flat filter wall 155 generally has a greater porosity with respect to the filter wall 163.

In the illustrated embodiment, the flat filter wall 155 is a polymer mesh having a porosity comprised between 100 and 200 μm, preferably 150 μm; while the filter wall 63 has a porosity of less than 120 μm in a case where it is of the pleated type, or it has at least one layer having a porosity of less than 20 μm in the case where it is of the depth type.

A shaped duct 156 is also positioned in the second chamber 165, which shaped duct 156 has a first end coupled to the hollow shank 153 of the plate 150 and a second end positioned at the bottom of the beaker body 121.

As illustrated in all the figures, a conduit 166 is afforded in the upper support plate 161 of the filter cartridge 160, which conduit 166 is suitable for directly placing the internal volume 164 of the filter wall 163 in communication with the external, i.e. the second chamber 165.

This conduit 166 terminates at the centre of a cylindrical seating 167, which is obtained on the outer face of the upper support plate 161, in an eccentric position with respect to the longitudinal axis A2 of the filter wall 163, substantially aligned with the lateral wall thereof.

In other words, the cylindrical seating 167 has a longitudinal axis B2 which is parallel and dealigned with respect to the longitudinal axis A2 of the filter wall 163, and which longitudinally crosses the thickness of the wall thereof.

The cylindrical seating 167 sealingly receives an automatic valve, generally denoted by 170, which is adapted to intercept the conduit 166 so as to regulate the opening and closure thereof.

From the above description, it clearly emerges that the filter 110 is entirely similar to the filter 10 of the first embodiment, from which it differs only in the characteristics reported in the following and relating to the valve 170.

In detail, the automatic valve 170 comprises a valve body 171, substantially configured like an internally hollow cylinder, which is coaxially inserted within the cylindrical seating 167, by means of a removable fit-coupling. In the illustrated example, the valve body 171 comprises two beaker bodies, respectively 171' and 171", which have the respective cavities facing on opposite sides and are coaxially inserted and fitted one on the other.

A central through hole 172 having axis parallel to the axis B of the cylindrical seating 167 is obtained on the bottom of the valve body 171, which through hole 172 is suitable for placing the conduit 166 in communication with the internal cavity 173 of the valve body 171.

An obturator 174 is located in the internal cavity 173 of the valve body 171. The obturator 174 comprises a stem 175 having an axis parallel to the axis B of the cylindrical seating 167, and a widened disc-shaped plate 176, which is coaxially positioned at the lower end of the stem 175, such as to give the obturator 174 a substantially mushroom-like shape. The stem 175 and the widened plate 176 are made in a monolithic body. The stem 175 is coaxially and slidably inserted in a guide hole 177 obtained at the top of the valve body 171. The guide hole 177 is coaxial to the central hole 172 afforded on the bottom, so as to guide the obturator 174 to move axially nearing and distancing with respect thereto. An annular gasket 178 is fixed on the lower face of the widened plate 176, i.e. the one facing towards the bottom of the valve body 171. The gasket 178 is made of a plastic material substantially having the properties of rubber, and it is fixed to the widened plate 176 through means that are of known type. The gasket 178 has an internal diameter that is smaller than the diameter of the central hole 172 and an outer diameter larger than the central hole 172. Thus, the gasket 178 is destined to rest on the internal edge 179 of the central hole 172, closing it and hence also closing the conduit 166.

In particular, the gasket 178 of the obturator 174 is kept pressed against the internal edge 179 by a first elastic element 180, which is received in the internal cavity 173 of the valve body 171. In the illustrated example, the first elastic element 180 is a helical compression spring, which is coaxially inserted on the stem 175 and it is pre-compressed between the widened plate 176 and the top wall of the valve body 171.

A heat sensitive element 181, which is positioned outside and on the top wall of the valve body 171 is further associated to the automatic valve 170. In the illustrated example, this heat sensitive element 181 is defined by a thin plate, which has a concave configuration and rests on the free end of the stem 175, with the ends fixed to the top wall of the valve body 171.

When the obturator 174 moves upwards, distancingly from the central hole 172 (see FIG. 4), the plate 181 can be flexible so as to react with an elastic force which tends to push the obturator 174 downwards once again, additionally to the force exerted by the spring 180. In words, the plate 181 can be configured to serve as an elastic element destined to keep the gasket 178 of the obturator 174 pressed against the internal edge 179 of the central hole 172. In this case, the plate 181 can be made using a heat sensitive metal material so that the elastic constant of the plate 181 increases as the temperature increases. For example, the plate 181 can be realised with a memory material which, as the temperature increases, reaches a martensitic stage with a consequent increase of the elastic constant. Thus, when the temperature of the plate 181 is low, for example below 5° C., it offers almost no resistance to the lifting of the obturator 174, which is thus controlled solely by the spring 180. Instead, when the temperature of the plate 181 is high, for example above 150° C., the resistance offered thereby is so high as to substantially prevent the obturator 174 from moving upwards at all.

Figure 9:
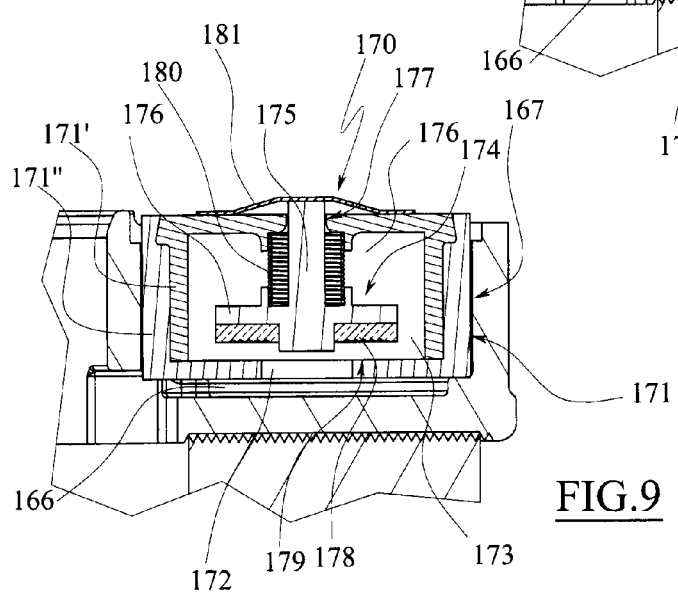
FIG. 9 is the detail of FIG. 8, which shows the bypass valve in the open position.

Alternatively, the plate 81 may not be an elastic element, but more simply a rigid element made using a memory material or a bimetallic material such to modify the concavity thereof as a function of the temperature. In more detail, the plate 181 might be a bimetallic plate comprising two layers realised using materials having different heat dilation properties from one another, such that, as the temperature varies, one layer dilates more than the other, deforming the plate 181. Thus, at a low temperature, for example below 5° C., the shape of the plate 181 could be that of FIG. 9, i.e. with concavity sufficiently accentuated to move away from the top of the valve body 171, leaving the obturator 174 free to move upwards, contrasted only by the spring 180. At a high temperature, for example above 150° C., the shape of the plate 81 could instead be that of FIG. 3, i.e. sufficiently flat to remain constantly in contact from the free end of the stem 175, preventing the obturator 174 from moving upwards.

In the light of the description above, the filter 110 operates as follows.

The diesel to be filtered enters from the inlet conduit 123 and, via the connection channel (not shown) afforded in the monolithic component 130 and the interspace 143, flows into the internal volume 164 of the filter wall 163.

During this passage, the diesel can be heated by the heater which is incorporated in the widened portion 131 of the monolithic component 130.

From the internal volume 164, the diesel is forced to flow radially through the filter wall 163, from the inside towards the outside, and flow into the second chamber 165.

Thus the filter wall 163 withholds the impurities which can be present in the diesel.

Leaving the second chamber 165 the diesel then crosses the flat filter wall 155 which, having a greater porosity than the filter wall 163, mainly has the function of separating the water which may be still contained in the diesel by coalescence.

The water thus separated is collected on the bottom of the beaker body 121 and, when the water level reaches the sensor 134, the sensor 134 sends—to the vehicle control unit—a signal, following which the accumulated water is made to flow out from the filter 110 through the shaped duct 156 and the exhaust conduit 125.

After crossing the flat filter wall 155, the diesel finally reaches the outlet conduit 124.

The diesel which passes into the second chamber 165 strikes the heat sensitive plate 181, substantially moving it to the temperature of the diesel itself. Should the diesel temperature be sufficiently high, for example above 150° C., the plate 181 keeps the obturator 174 of the automatic valve 170 constantly pressed against the internal edge 179 of the central hole 172. Thus, regardless of the pressure difference between the diesel upstream and downstream of the filter wall 163, the conduit 166 remains closed, or it opens due to pressure drops so high as to prevent ignition or operation of the Diesel engine. Instead, should the diesel temperature be low, for example below 5° C., the plate 181 does not oppose the movements of the obturator 174, which are controlled by the spring 180 alone. Thus, should the pressure of the diesel in the internal volume 164 increase above a determined threshold value defined by the preload of the spring 180, for example following an increase of viscosity due to the thickening of the paraffins, the obturator 174 lifts with respect to the central hole 172, causing the opening of the conduit 166 which terminates in the internal cavity 173 of the automatic valve 170, which in turn is in communication with the second chamber 165 of the filter 110 through one or more through holes (not shown) afforded in the top part of the valve body 171.

In this way, the unfiltered diesel flows directly into the second chamber 165 without crossing the filter wall 163, guaranteeing the presence of a given outflow of diesel from the outlet conduit 124 capable of starting up the diesel engine. In this case too, all the diesel is in any case forced to cross the flat filter wall 155 which, besides the aforementioned function of separating the water, is also destined to subject the diesel to a coarse filtration which purifies it at least from the impurities of larger dimensions.

Obviously a technical expert in the second might make numerous modifications of a technical-applicational nature to the above-described filters 10 and 110 without forsaking the ambit of the invention as described in the following claims.

The invention claimed is:

1. A filter cartridge (60, 160) comprising a filter wall (63, 163) having a tubular shape and at least a support plate (61, 161) fixed to an end of the filter wall (63, 163), wherein a by-pass conduit (66, 166) is fashioned in the support plate (61, 161), which by-pass conduit (66, 166) is designed to place an internal volume (64, 164) delimited by the filter wall (63, 163) in communication with outside, which by-pass conduit (66, 166) is intercepted by a valve (70, 170) which is associated to the support plate (61, 161) in an out-of-centre position with respect to a longitudinal axis (A, A2) of the filter wall (63, 163), wherein the valve (70, 170) comprises an internally-hollow valve body (71, 171), which is provided with a hole (72, 172) suitable for setting the bypass conduit (66, 166) in communication with the internal cavity of the valve body (71, 171), an obturator (73, 174) housed in the internal cavity of the valve body (71, 171), and an elastically-acting element (75, 180) suitable for pressing the obturator (73, 174) against a valve seating (74, 179) such as to close the hole (72, 172), the valve (70, 170) being housed internally of a blind seating (67, 167) afforded in the support plate (61, 161), wherein said blind seating (67, 167) opens on an external surface of the support plate (61, 161) opposite to the filter wall.

2. The filter cartridge (60, 160) of claim 1, wherein the valve (70, 170) is aligned with a lateral wall of the filter wall (63, 163).

3. The filter cartridge (60, 160) of claim 1, wherein the valve (70, 170) is unremovably housed internally of said seating (67, 167).

4. The filter cartridge (60, 160) of claim 1, wherein the valve (70, 170) is removably housed in the seating (67, 167).

5. The filter cartridge (60, 160) of claim 1, wherein the valve (70, 170) is configured such as to open the by-pass conduit (66, 166) following a pressure increase in the internal volume (64, 164) delimited by the filter wall (63, 163).

6. The filter cartridge (60) of claim 1, wherein the valve (70) comprises a spherical obturator (73) and at least an elastic plate (76) configured to maintain the obturator (73) pressed against the valve seating (74), such as to close the by-pass conduit (66).

7. The filter cartridge (60) of claim 6, wherein the valve body (71) is cylindrical.

8. A filter cartridge (161) according to claim 1, further comprising a heat-sensitive element (181) configured such as to occlude the bypass conduit (166) when the temperature of the heat-sensitive element (181) exceeds a predetermined threshold value.

9. The filter cartridge (160) of claim 8, whereom the heat-sensitive element (181) is associated to the valve (170).

10. The filter cartridge (160) of claim 9, wherein the heat-sensitive element (181) is an elastically-acting element suitable for pressing the obturator (174) against the valve seating (179), which element has an elastic constant that grows following an increase in temperature.

11. The filter cartridge (160) of claim 9, wherein the heat-sensitive element (181) is predisposed such that, following an increase in temperature, it is configured to move from an initial configuration, in which it is separated from the obturator (174) leaving the obturator (174) free to distance from the valve seating (179), in contrast with the elastically-acting element (180), to a final configuration, in which it is in contact with the obturator (174), blocking the obturator (174) against the valve seating (179).

12. The filter cartridge (160) of claim 8, wherein the heat-sensitive element (181) is predisposed such that following an increase in temperature, it is configured to move from an initial configuration, in which it leaves the bypass conduit (166) open, to a final configuration, in which it obstructs the bypass conduit (166).

13. A filter (10, 110) comprising an external casing (20, 120) provided with an inlet (23, 123) for a fluid to be filtered and an outlet (24, 124) for filtered fluid, and a filter cartridge (60, 160) as in claim 1, configured to divide an internal volume of the casing (20, 120) into a first chamber (64, 164) communicating with the inlet (23, 123) and a second chamber (65, 165) communicating with the outlet (24, 124).

14. The filter (10, 110) of claim 13, wherein the filter cartridge (60, 160) is positioned such that the first chamber is at least partly defined by the internal volume (64, 164) delimited by the filter wall (63, 163), and in that the by-pass conduit (66, 166) is configured to place the internal volume (64, 164) in communication with the second chamber (65, 165).

15. The filter (10, 110) of claim 14, whereinn the second chamber (65, 165) communicates with the outlet (24, 124) via a second filter wall (55, 155) having a greater porosity than the filter wall (63, 163) of the filter cartridge (60, 160).

* * * * *